US012088032B2

(12) United States Patent
Yang et al.

(10) Patent No.: US 12,088,032 B2
(45) Date of Patent: Sep. 10, 2024

(54) ELECTRICAL CONNECTOR WITH FEATURES TO PREVENT WARPING OF THE SOLDERING PORTION OF THE TERMINALS

(71) Applicant: Molex, LLC, Lisle, IL (US)

(72) Inventors: Yun-Fang Yang, Shanghai (CN); Zhong-Shan Han, Shanghai (CN); Hao Yin, Shanghai (CN)

(73) Assignee: Molex, LLC, Lisle, IL (US)

(*) Notice: Subject to any disclaimer, the term of this patent is extended or adjusted under 35 U.S.C. 154(b) by 0 days.

(21) Appl. No.: 17/467,650

(22) Filed: Sep. 7, 2021

(65) Prior Publication Data

US 2022/0085539 A1 Mar. 17, 2022

(30) Foreign Application Priority Data

Sep. 14, 2020 (CN) ........................ 202010960836.1

(51) Int. Cl.

| | |
|---|---|
| ***H01R 13/405*** | (2006.01) |
| ***H01R 12/72*** | (2011.01) |
| ***H01R 13/6581*** | (2011.01) |
| *H01R 12/50* | (2011.01) |
| *H01R 13/502* | (2006.01) |

(Continued)

(52) U.S. Cl.

CPC ......... *H01R 13/405* (2013.01); *H01R 12/724* (2013.01); *H01R 13/6581* (2013.01); *H01R 12/50* (2013.01); *H01R 13/502* (2013.01); *H01R 13/504* (2013.01); *H01R 13/521* (2013.01); *H01R 13/5216* (2013.01);

(Continued)

(58) Field of Classification Search

CPC ................ H01R 13/405; H01R 12/724; H01R 13/6581; H01R 13/504; H01R 13/521; H01R 13/5216; H01R 13/533; H01R 13/6595; H01R 13/6582; H01R 12/50; H01R 13/502

See application file for complete search history.

(56) References Cited

U.S. PATENT DOCUMENTS

| | | | | |
|---|---|---|---|---|
| 4,690,482 A * | 9/1987 | Chamberland | H01R 13/533 439/283 |
| 9,525,236 B2 * | 12/2016 | Lee | H01R 13/5202 |
| 2019/0348808 A1 * | 11/2019 | Zhao | H01R 43/205 |

FOREIGN PATENT DOCUMENTS

| | | |
|---|---|---|
| CN | 205429282 U | 8/2016 |
| CN | 206225655 U | 6/2017 |

(Continued)

*Primary Examiner* — Justin M Kratt

(57) ABSTRACT

An electrical connector includes an insulative housing, a plurality of conductive terminals and a metal shell. The housing includes a base portion, a tongue protruding forwardly from the base portion and a terminal fixing portion positioned behind the base portion; a groove is provided between the base portion and the fixing portion to allow glue to fill therein; the fixing portion is provided with at least one fencing portion at a side of the fixing portion adjacent to the groove, the fencing portion is formed with a hollow recessed groove therein. The terminals are provided to the housing; each terminal includes a mating portion exposed on the tongue, a soldering portion extending out of the fixing portion and a connecting portion connected between the mating portion and the soldering portion; a part of the connecting portion is exposed to the groove. The shell sheathes an outer circumference of the housing.

20 Claims, 11 Drawing Sheets

(51) Int. Cl.
*H01R 13/504* (2006.01)
*H01R 13/52* (2006.01)
*H01R 13/533* (2006.01)
*H01R 13/6582* (2011.01)
*H01R 13/6595* (2011.01)

(52) U.S. Cl.
CPC ........ *H01R 13/533* (2013.01); *H01R 13/6582* (2013.01); *H01R 13/6595* (2013.01)

(56) References Cited

FOREIGN PATENT DOCUMENTS

| | | | | |
|---|---|---|---|---|
| CN | 105470697 | B | | 6/2018 |
| CN | 110707471 | A | * | 1/2020 |
| CN | 210182659 | U | | 3/2020 |
| KR | 20160085683 | A | * | 7/2016 |

* cited by examiner

ELECTRICAL CONNECTOR WITH FEATURES TO PREVENT WARPING OF THE SOLDERING PORTION OF THE TERMINALS

RELATED APPLICATIONS

The present application claims priority to Chinese Patent Application No. 202010960836.1 filed on Sep. 14, 2020 which is incorporated herein by reference in its entirety.

BACKGROUND OF THE INVENTION

Field of the Invention

The present disclosure relates to the field of electrical connector, and particularly relates to an electrical connector having higher reliability.

Description of Related Art

CN105470697B discloses an electrical connector which includes an insulative body, conductive terminals held in the insulative body, a metal shell sheathing the insulative body and the conductive terminals from outside to form a receive space and a waterproof plate positioned behind the receive space and formed by dispensing a glue, the insulative body includes a recessed groove, a tongue portion positioned in front of the recessed groove and a holding portion positioned behind the recessed groove, the conductive terminal includes a contacting end exposed on the tongue portion, a connecting arm exposed in the recessed groove, a holding arm held to the holding portion and a soldering end extending out of the holding portion, the waterproof plate is formed in the recessed groove and a rear end of the waterproof plate is at least partially exposed to the external. In this solution, the waterproof plate is formed to the recessed groove by dispensing a glue, when the electrical connector is soldered on a circuit board, the waterproof plate will be expanded due to heat subjected from the soldering process, and thus generates a squeezing force with respect to the holding portion, which easily causes the holding portion to warp upwardly, in turn the holding portion causes the soldering end of the conductive terminal to warp, thereby resulting in poor soldering between the electrical connector and the circuit board, product reliability is affected.

CN210182659U discloses an electrical connector which is used to allow a mating connector to mate therewith, and the electrical connector includes: an insulative body which is provided with a base portion and a tongue positioned in front of the base portion; at least one shielding member is provided to the base portion or/and the tongue, and the shielding member abuts against the mating connector; a shell surrounding an outer circumference of the base portion, the tongue and the shielding member, an inserting space is formed between the shell and the tongue, and the shielding member is exposed to the inserting space, the mating connector is inserted into the inserting space and two sides of the mating connector respectively abut against the shell and the shielding member, the shell has a covering region, the covering region is positioned above the base portion, the shell is provided with at least one thin layer region corresponding to the shielding member, the thin layer region is welded with the shielding member, and in a vertical direction, a thickness of the thin layer region is less than a thickness of the covering region. In this solution, the shell is designed to have different thicknesses at the different regions, so the shell can be firmly welded with the shielding member and has better shielding effect. However such a shell having different thicknesses at different regions only can be manufactured by a metal powder metallurgy process, manufacturing cost of such a metal powder metallurgy process is high and the manufactured shell is thick and heavy, which is not beneficial to lower cost and of reducing the weight of the electronic product.

Based on the prior art, in order to promote reliability of the electrical connector, it is necessary to make further improvement.

BRIEF SUMMARY OF THE INVENTION

A technical problem to be solved by the present disclosure is to provide an electrical connector having higher reliability so as to overcome the deficiency in the prior art.

According to one aspect of the present disclosure, the present disclosure provides an electrical connector comprising an insulative housing, a plurality of conductive terminals and a metal shell. The insulative housing comprises a base portion, a mating tongue protruding forwardly from the base portion and a terminal fixing portion positioned behind the base portion; a glue receiving groove is provided between the base portion and the terminal fixing portion to allow a glue to fill therein; the terminal fixing portion is provided with at least one fencing portion at a side of the terminal fixing portion adjacent to the glue receiving groove, the fencing portion is formed with a hollow recessed groove therein. The plurality of conductive terminals are provided to the insulative housing; each conductive terminal comprises a mating portion exposed on the mating tongue, a soldering portion extending out of the terminal fixing portion and a connecting portion connected between the mating portion and the soldering portion; a part of the connecting portion is exposed to the glue receiving groove. The metal shell sheathes an outer circumference of the insulative housing.

According to another aspect of the present disclosure, the present disclosure provides an electrical connector comprising an insulative housing, a plurality of conductive terminals, two metal fixing parts and a metal shell. The insulative housing comprises a base portion and a mating tongue protruding forwardly from the base portion. The plurality of conductive terminals are provided to the insulative housing; each conductive terminal comprising a mating portion exposed to the mating tongue and a soldering portion rearwardly extending out of the insulative housing. The two metal fixing parts are respectively fixed to an upper side and a lower side of the insulative housing; each metal fixing part comprises a horizontal protecting portion, a horizontal fixing portion and a vertical extending portion connected between the horizontal protecting portion and the horizontal fixing portion; the horizontal protecting portion has a first thickness and covers a rear portion of the mating tongue; the horizontal fixing portion has a second thickness and is inserted into the base portion; the first thickness is less than the second thickness. The metal shell sheathes an outer circumference of the insulative housing and is welded with the horizontal fixing portion.

In comparison with the prior art, in the electrical connector of the present disclosure, the terminal fixing portion of the insulative housing is provided with the hollow fencing portion thereon, the fencing portion is provided adjacent to the glue receiving groove, when the electrical connector is soldered to a circuit board, the fencing portion may absorb deformation amount of the glue when the glue is subjected to heat and is expanded, so as to prevent the glue from applying a force to the terminal fixing portion to generate a flip torque with respect to the terminal fixing portion and to cause the soldering portion of the conductive terminal to warp upwardly, poor soldering phenomenon resulted from warping of the soldering portion is reduced, product yield of the electrical connector is promoted.

The metal fixing part has the horizontal protecting portion and the horizontal fixing portion which have inconsistent thicknesses. The horizontal protecting portion having a smaller thickness covers the thickening portion of the mating tongue, may avoid occurrence of improper electrical contact with the conductive terminal in the mating tongue, at the same time also increase strength of the mating tongue to prevent the mating tongue from being broken off. The horizontal fixing portion having a larger thickness is inserted into the base portion, and is welded with the metal shell together by a laser, the horizontal fixing portion having the larger thickness may prevent the horizontal fixing portion from being burnt through by the laser, so that the horizontal fixing portion may be reliably welded with the metal shell together, thereby promoting connection stability and grounding shield effect of the metal shell and the insulative housing. The metal fixing part which has inconsistent thicknesses and the metal shell which has a consistent thickness in the front-rear direction and formed by a drawing process or a stamping process are used in combination, it may be very convenient to correspondingly adjust the thickness of the horizontal fixing portion according to the metal shell 4 having a different thickness, it is low in cost and has flexibility in design.

THE REFERENCE NUMERALS ARE REPRESENTED AS FOLLOWS

Figure 1:
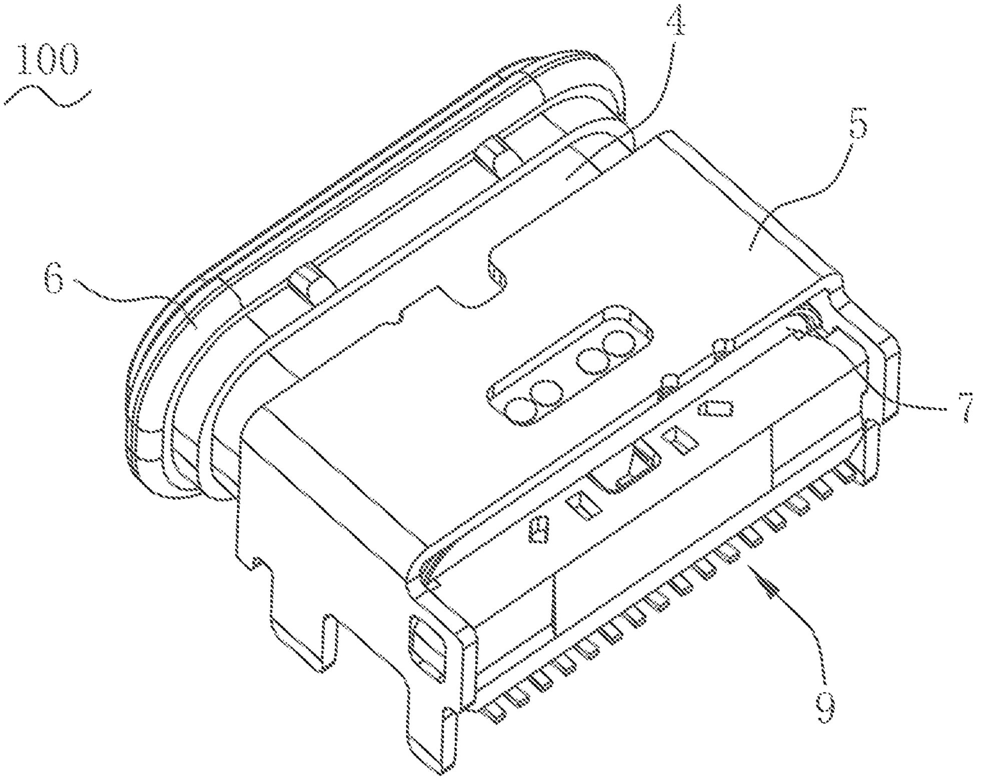
FIG. 1 and FIG. 2 are perspective views of an embodiment of an electrical connector of the present disclosure from two different angles.
Figure 2:
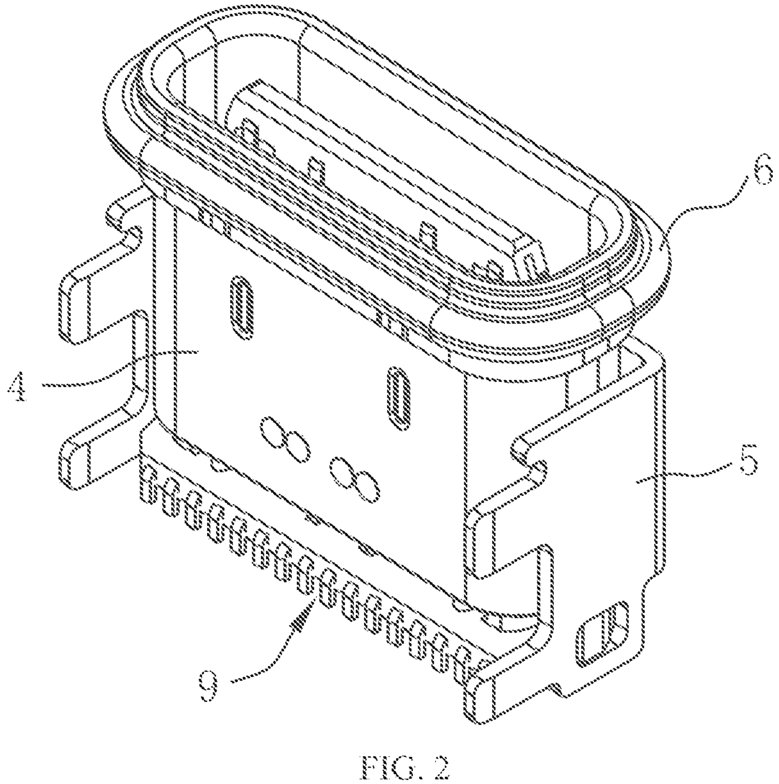
Figure 3:
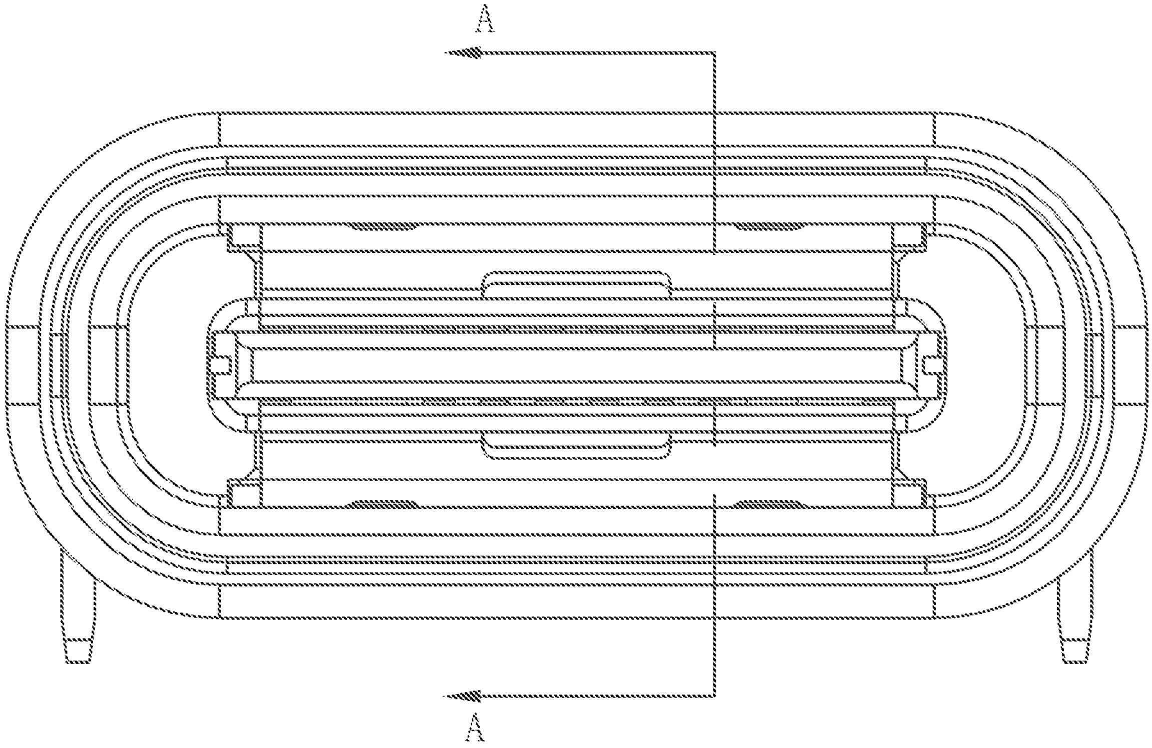
FIG. 3 is a front view of FIG. 1.

100/100*a* electrical connector
1 insulative housing
11 base portion
111 fixing groove
112 latching groove
12 mating tongue
121 front tongue portion
122 tongue thickening portion
1221 mounting groove
13 terminal fixing portion
131 blocking portion
132 guiding portion
1321 protrusion
14 connecting rib
15 glue receiving groove
16 recessed portion
17 fencing portion
171 front partitioning wall
172 side partitioning wall
173 recessed groove
2 conductive terminal
21 mating portion
22 connecting portion
23 soldering portion
3 metal fixing part
31 horizontal protecting portion
32 vertical extending portion
33 horizontal fixing portion
34 vertical latching portion
4 metal shell
41 mating cavity
5/5*a* fixing shell
51/51*a* top plate
511 through hole
52/52*a* side plate
53 front fixing leg
54/54*a* rear fixing leg
55/55*a* latching hole
56*a* positioning flange
57*a* fixing piece
571*a* fixing aperture
6 waterproof sealing ring
7 glue
8 latching metal member
9 terminal base

DETAILED DESCRIPTION OF THE INVENTION

While the present disclosure may be susceptible to embodiments in different forms, there are shown in the figures, and will be described herein in detail, are only specific embodiments, with the understanding that the present disclosure is to be considered as an exemplification of the principles of the present disclosure, and is not intended to limit the present disclosure to that as illustrated.

As such, references to a feature are intended to describe a feature of an embodiment of the present disclosure do not to imply that every embodiment thereof must have the described feature. Furthermore, it should be noted that the description illustrates a number of features. While certain features may be combined together to illustrate potential system designs, those features may also be used in other combinations not expressly described. Thus, the described combinations are not intended to be limiting, unless otherwise noted.

In the embodiments illustrated in the figures, representations of directions such as up, down, left, right, front and rear, used for explaining the structure and movement of the various components of the present disclosure, are not absolute, but relative. These representations are appropriate when the components are in the position shown in the figures. If the description of the position of the components changes, however, these representations are to be changed accordingly.

Hereinafter embodiments of the present disclosure will be described in detail in combination with the drawing of the present specification.

Referring to FIG. 1 to FIG. 9, the present embodiment provides an electrical connector 100 in waterproof type, an example of the electrical connector 100 is USB type-C connector, supports bi-direction mating of a 180 degrees upside down rotation. The electrical connector 100 includes an insulative housing 1, a plurality of conductive terminals 2, two metal fixing parts 3, a metal shell 4, a fixing shell 5, a waterproof sealing ring 6, a glue 7 and two latching metal members 8. Preferably, the insulative housing 1, the plurality of conductive terminals 2 and the two latching metal members 8 are engaged with each other as an integral piece by insert molding to constitute a terminal base 9. The two metal fixing parts 3 are respectively fixed to an upper side and a lower side of the insulative housing 1, the metal shell 4 sheathes an outer circumference of the terminal base 9, the fixing shell 5 is fixed to above the metal shell 4, the waterproof sealing ring 6 sheathes a front end of the metal shell 4, the glue 7 is filled between a rear end of the terminal base 9 and the metal shell 4.

Figure 9:
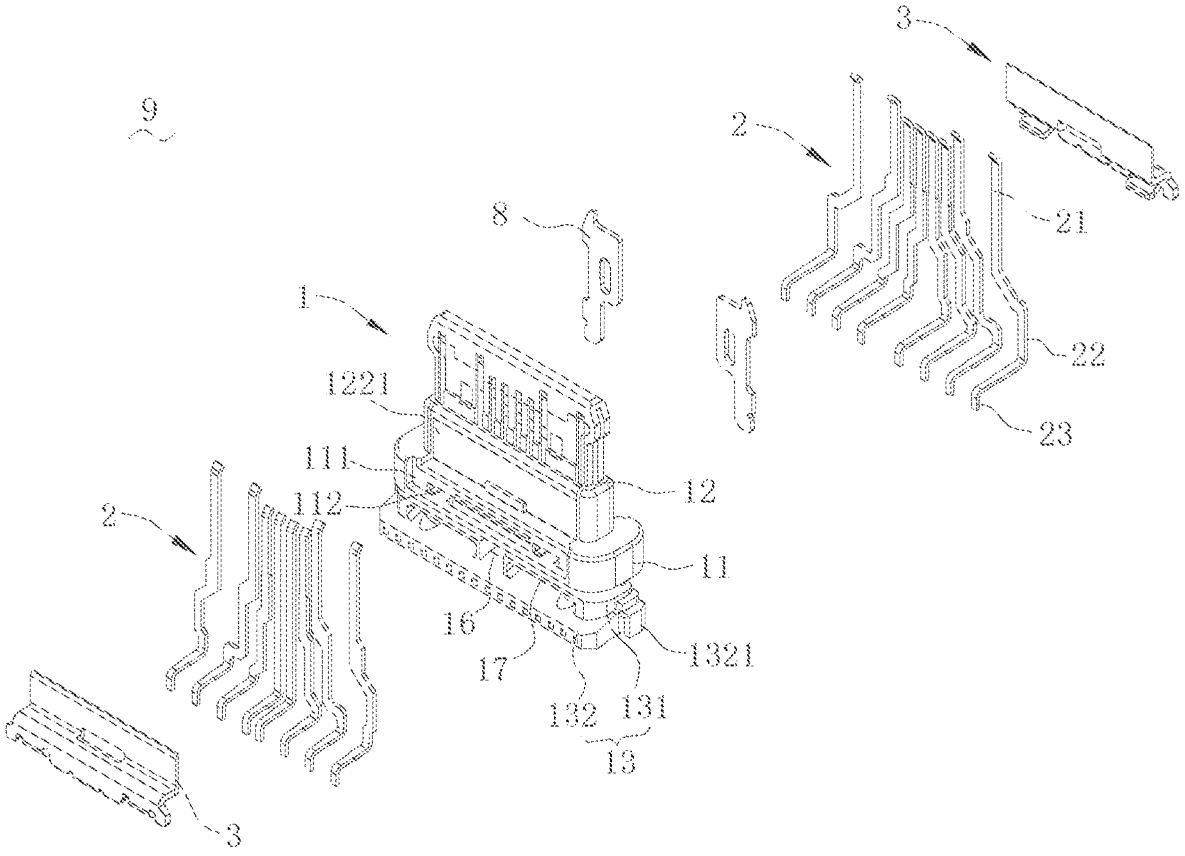
FIG. 9 is a further exploded view of a terminal base of FIG. 7.
Figure 10:
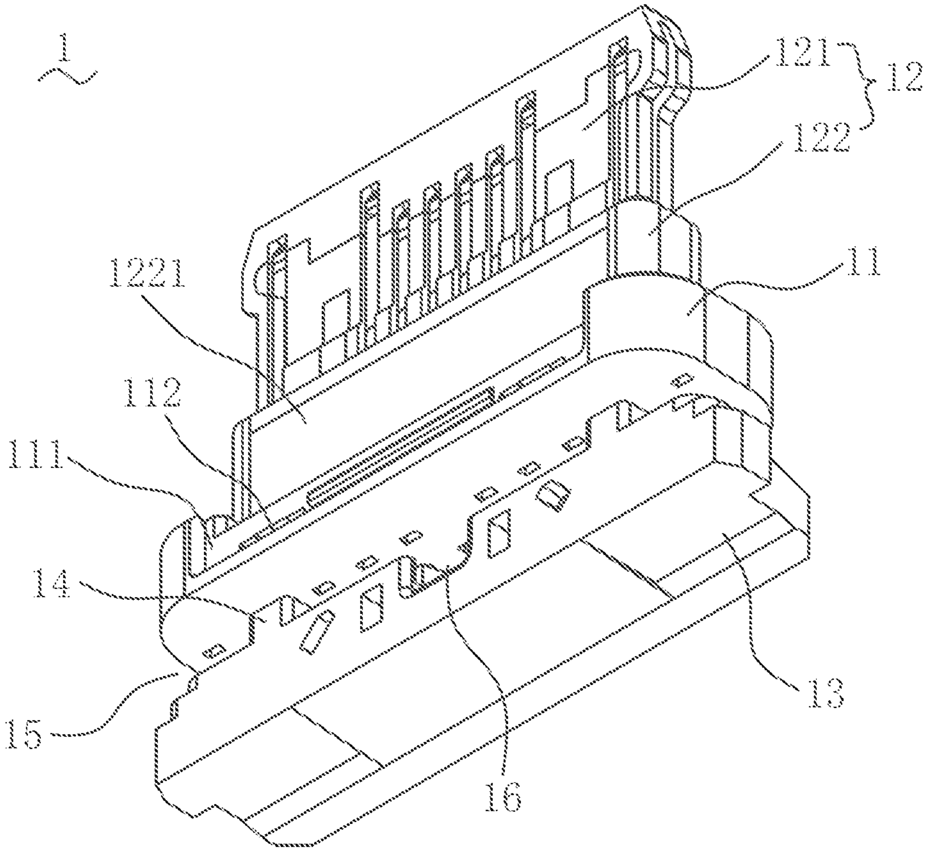
FIG. 10 is a perspective view of an insulative housing of FIG. 9 from another angle.
Figure 11:
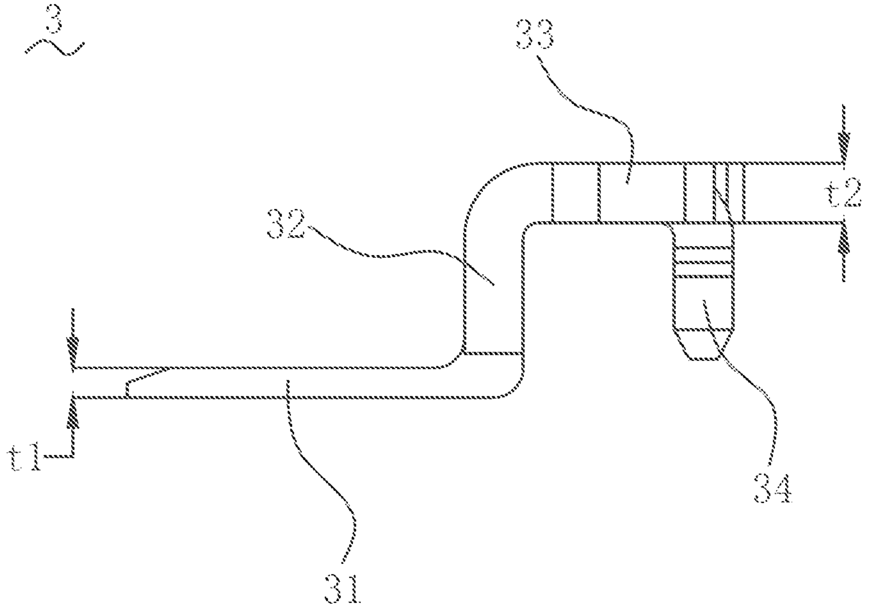
FIG. 11 is a side view of a metal fixing part of FIG. 9.

Referring to FIG. 9 and FIG. 10, the insulative housing 1 mainly includes a base portion 11, a mating tongue 12 protruding forwardly from the base portion 11, a terminal fixing portion 13 positioned behind the base portion 1 and two connecting ribs 14 connected between the base portion 11 and the terminal fixing portion 13.

The base portion 11 has generally a rectangular block shape, an upper surface and a lower surface of the base portion 11 each are provided with a fixing groove 111 and two latching grooves 112 further recessed from a bottom of the fixing groove 111.

The mating tongue 12 includes a front tongue portion 121 and a tongue thickening portion 122. The front tongue portion 121 is positioned in front of the tongue thickening portion 122, and has a smaller thickness than the tongue thickening portion 122. The tongue thickening portion 122 correspondingly has a larger thickness, the tongue thickening portion 122 is connected with the base portion 11. A surface of the tongue thickening portion 122 is provided with a mounting groove 1221, the mounting groove 1221 is communicated with a front end surface of the base portion 11.

Two sides of the terminal fixing portion 13 are connected with a rear end of the base portion 11 respectively by the two connecting ribs 14, a glue receiving groove 15 penetrating in an up-down direction is formed between the terminal fixing portion 13 and the base portion 11, the glue receiving groove 15 is used to allow the glue 7 to be filled therein. In the present embodiment, a middle of the glue receiving groove 15 further has a recessed portion 16 protruding rearwardly, the provision of the recessed portion 16 expands a space of the glue receiving groove 15, is beneficial for the glue 7 to flow in the up-down direction to uniformly and fully fill the glue receiving groove 15. The recessed portion 16 is formed to a front end surface of the terminal fixing portion 13, that is, a middle of the front end surface of the terminal fixing portion 13 is recessed to form the recessed portion 16, the recessed portion 16 penetrates the terminal fixing portion 13 in the up-down direction.

Figure 7:
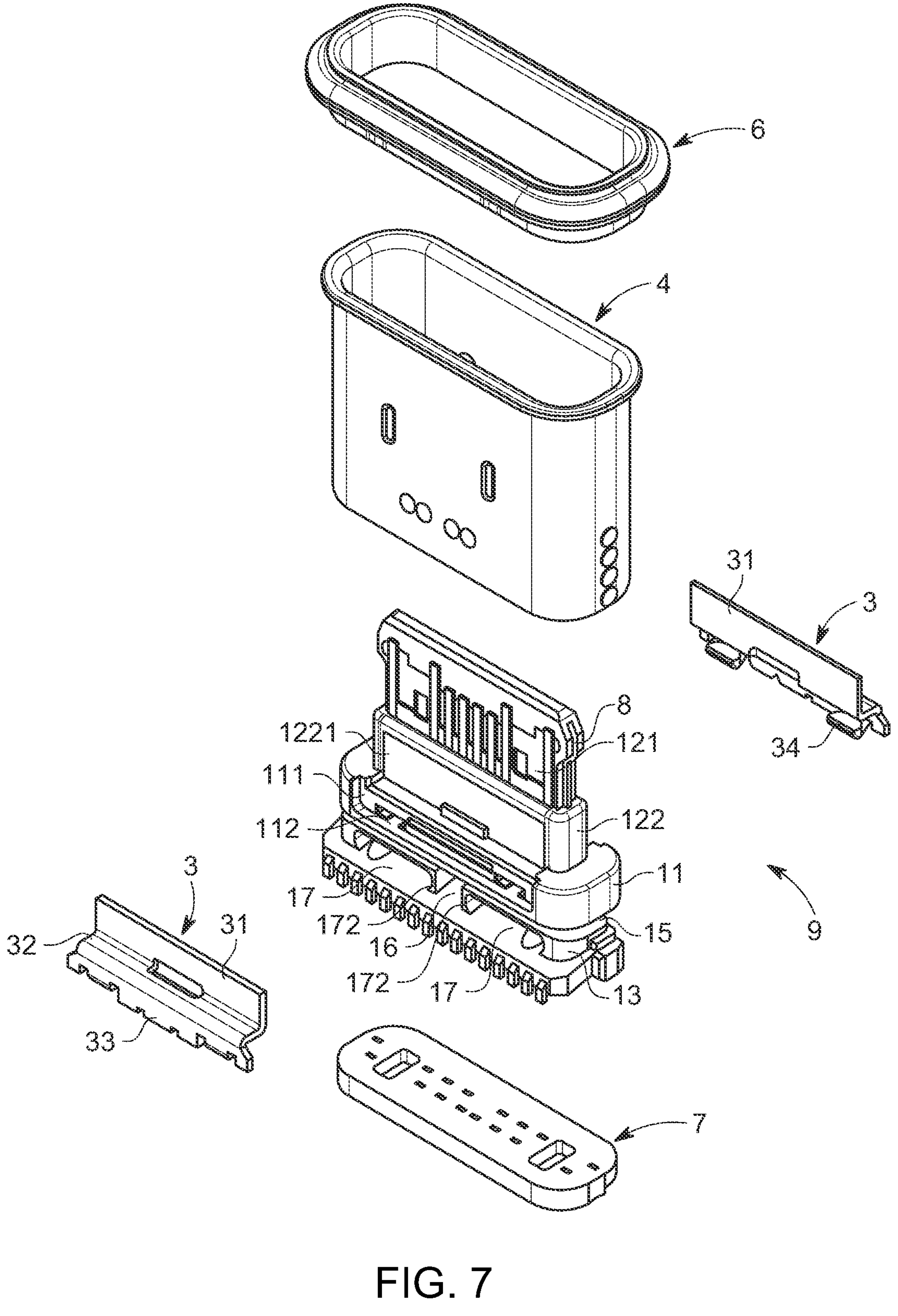
FIG. 7 and FIG. 8 are perspective views further exploded on the basis of FIG. 6 and viewed from two different angles with a fixing shell removed.

In the present embodiment, as best shown in FIG. 7, the terminal fixing portion 13 is provided with two hollow fencing portions 17 at a side of a bottom portion of the terminal fixing portion 13 adjacent to the glue receiving groove 15, the two fencing portions 17 are positioned to an adjacent rear side of the glue receiving groove 15 to limit improper flow of the glue 7, and may receive superfluous amount of the glue 7 overflowed from the glue receiving groove 15. The fencing portion 17 mainly includes a front partitioning wall 171, a side partitioning wall 172 and a recessed groove 173 encircled by the front partitioning wall 171 and the side partitioning wall 172 from outside. The two side partitioning walls 172 are respectively positioned at two sides of the recessed portion 16. The fencing portion 17 has generally a rectangular circumferential contour, an opening of the recessed groove 173 of the fencing portion 17 is toward downwardly. Both the front partitioning wall 171 and the side partitioning wall 172 adjacent to the glue receiving groove 15 are very thin in thickness, the recessed groove 173 is hollow to form a receive space, so that the fencing portion 17 may be deformed to absorb an expansion amount of the glue 7 generated when subjected to heat.

The terminal fixing portion 13 has a step shape, includes a blocking portion 131 and a guiding portion 132 protruding downwardly from behind the blocking portion 131. A protrusion 1321 protrudes outwardly from each of two sides of the guiding portion 132. A bottom of the guiding portion 132 is downwardly beyond a bottom surface of the blocking portion 131. The blocking portion 131 is adjacent to the glue receiving groove 15. The fencing portion 17 is provided to the bottom surface of the blocking portion 131 and is connected with the guiding portion 132.

Figure 4:
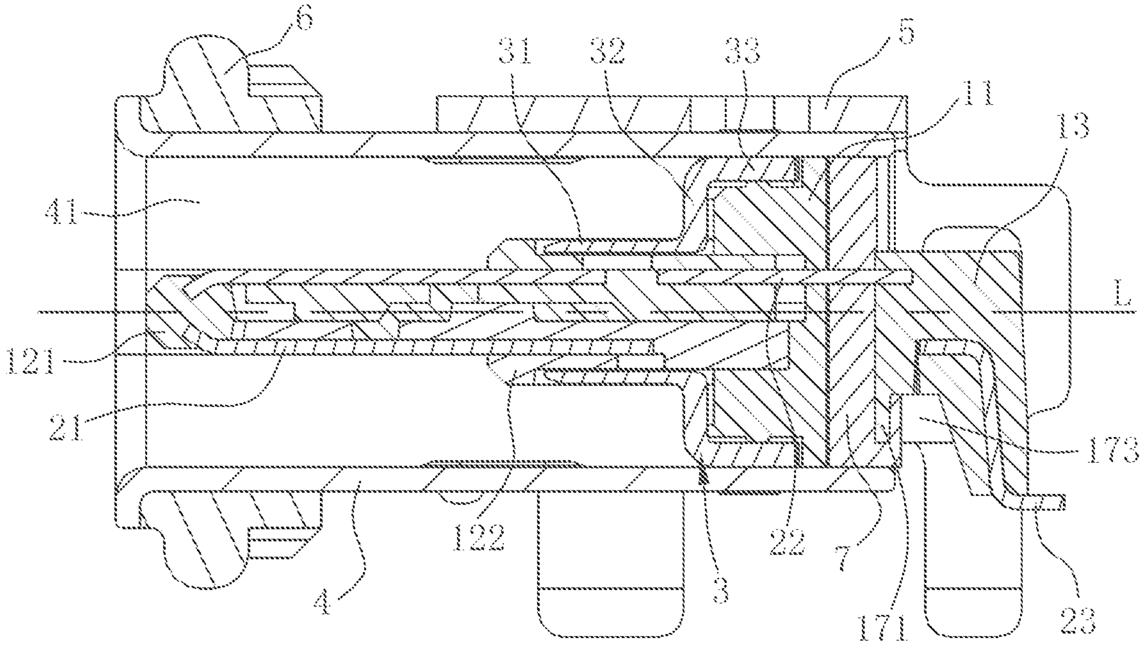
FIG. 4 is a cross sectional view taken along a line A-A of FIG. 3.

Referring to FIG. 4, both the base portion 11 and the mating tongue 12 of the insulative housing 1 each are a symmetric structure relative to a central axis L of the electrical connector 100 in the up-down direction. But the terminal fixing portion 13 is provided to offset toward below the central axis L, that is, a volume of a structure of the terminal fixing portion 13 positioned below the central axis L is larger than a volume of a structure of the terminal fixing portion 13 positioned above the central axis L, so that a center of gravity of the terminal fixing portion 13 is positioned in a lower half part of the terminal fixing portion 13, which is beneficial to resist upward flipping moment.

Referring to FIG. 4 to FIG. 9, the plurality of conductive terminals 2 are divided into two rows in the up-down direction and are fixed on the insulative housing 1. The arrangement of the plurality of conductive terminals 2 on the insulative housing 1 depends on a low speed version interface standard of the USB type-C, so as to support bi-direction mating of a 180 degrees upside down rotation.

Each conductive terminal 2 bends and extends along the front-rear direction, from the front to the rear includes a mating portion 21, a connecting portion 22 and a soldering portion 23. The connecting portion 22 is connected between the mating portion 21 and the soldering portion 23.

The mating portion 21 is exposed on the mating tongue 12 of the insulative housing 1, and is used to mate with another mating electrical connector (not shown). Specifically, the mating portion 21 is exposed on a surface of the front tongue portion 121 of the mating tongue 12.

The connecting portion 22 passes through the glue receiving groove 15 of the insulative housing 1 along the front-rear direction. A part of the connecting portion 22 is exposed to the glue receiving groove 15; a front end of the connecting portion 22 is fixed in the base portion 11; a rear end of the connecting portion 22 is fixed to the terminal fixing portion 13 and obliquely extends downwardly along the guiding portion 132 of the terminal fixing portion 13.

The soldering portion 23 extends out of the terminal fixing portion 13 and is used to be soldered to a circuit board (not shown) by a surface soldering process. Specifically, the soldering portion 23 extends out of the bottom of the guiding portion 132 of the terminal fixing portion 13 and horizontally extends rearwardly.

In the present embodiment, the soldering portions 23 of the plurality of conductive terminals 2 are transversely arranged side by side along the guiding portion 132. In other embodiment not shown, the soldering portions 23 of the plurality of conductive terminals 2 further may be divided into a plurality of rows to extend out of the terminal fixing portion 13, a fashion of the soldering portion 23 further may also be a vertical type structure.

Figure 8:
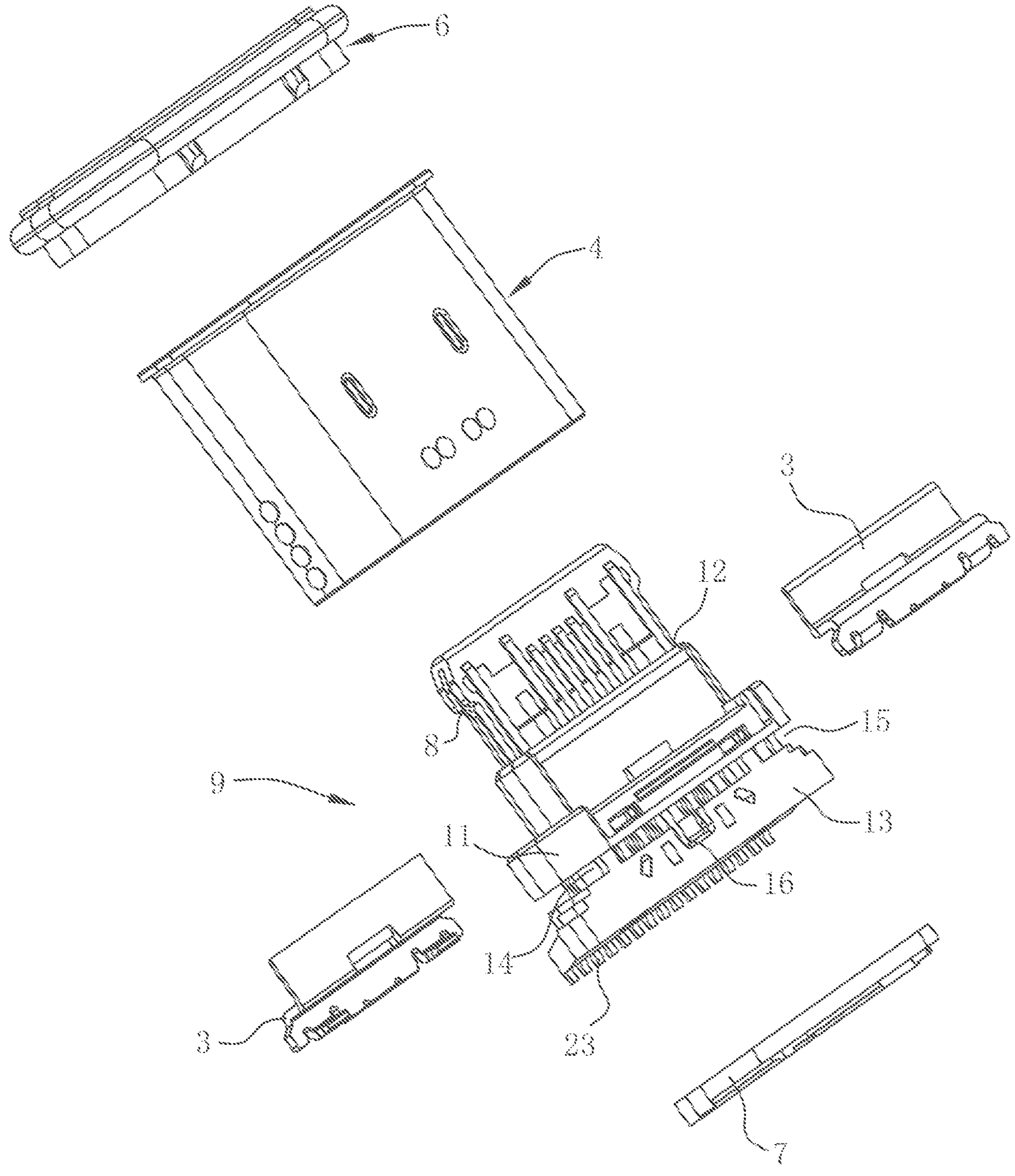

Referring to FIG. 7 to FIG. 9, the two latching metal members 8 are embedded in the mating tongue 12 of the insulative housing 1 and are positioned between the two rows of the plurality of the conductive terminals 2. The two latching metal members 8 are respectively positioned at two sides of the mating tongue 12 and slightly protrude side edges of the mating tongue 12 respectively. The two latching metal members 8 are used to latch with latching hooks of the another mating electrical connector (not shown) respectively.

Referring to FIG. 4 to FIG. 9 and FIG. 11, the two metal fixing parts 3 are respectively fixed to the upper side and the lower side of the insulative housing 1. The metal fixing part 3 includes a horizontal protecting portion 31, a vertical extending portion 32, a horizontal fixing portion 33 and two vertical latching portions 34 vertically bending from behind horizontal fixing portion 33. The metal fixing part 3 may be integrally formed by bending.

The horizontal protecting portion 31 covers the surface of the tongue thickening portion 122 of the insulative housing 1, specifically, the horizontal protecting portion 31 is inserted into the mounting groove 1221 on the surface of the tongue thickening portion 122, the horizontal protecting portion 31 is spaced apart from the conductive terminals 2, which are fixed in the tongue thickening portion 122 and are used to transmit a signal or a power, by a distance, so as to prevent wrong electrical contact from occurring. The horizontal protecting portion 31 has a relative smaller first thickness t1, so that when the horizontal protecting portion 31 is inserted into the surface of the tongue thickening portion 122, an appearance dimension specification of the USB type-C standard may be attained and the horizontal protecting portion 31 avoids to contact the conductive terminals 2 which are positioned in the mating tongue 12 and are used to transmit a signal or a power, at the same time the horizontal protecting portion 31 also can functions to strengthen the mating tongue 12 so as to prevent the mating tongue 12 from being broken off by an external force. Moreover, the horizontal protecting portion 31 further promotes electromagnetic shielding effect. In some cases not shown, the horizontal protecting portion 31 may electrically contact the conductive terminal 2 of the plurality of terminals 2 which is used to provide grounding function, so as to promote grounding effect.

The vertical extending portion 32 is respectively vertically connected to a rear end of the horizontal protecting portion 31 and a front end of the horizontal fixing portion 33. The vertical extending portion 32 is attached to the front end surface of the base portion 11 of the insulative housing 1.

The horizontal fixing portion 33 is inserted into a surface of the base portion 11 of the insulative housing 1, specifically, the horizontal fixing portion 33 is fixed in the fixing groove 111 of the base portion 11, an outer surface of the horizontal fixing portion 33 is basically flush with the surface of the base portion 11. The horizontal fixing portion 33 has a relative larger second thickness t2, the second thickness t2 is larger than the first thickness t1, so that it is convenient for the horizontal fixing portion 33 to be welded with the metal shell 4. In some embodiments, the first thickness t1 is 0.1 mm, the second thickness t2 is 0.2 mm. The horizontal fixing portion 33 having the thinner thickness may be made by an etching process or a stamping process for thinning.

The vertical latching portion 34 bends vertically from a rear end of the horizontal fixing portion 33 and extends. The vertical latching portion 34 inserts into the latching groove 112 of the base portion 11, so as to promote engagement strength between the metal fixing part 3 and the base portion 11.

Referring to FIG. 4 to FIG. 8, the metal shell 4 has an annular shape and sheathes an outer circumference of the insulative housing 1. The metal shell 4 may be manufactured by a drawing process or a stamping process and has a consistent thickness in the front-rear direction, and preferably may be manufactured by the drawing process so that an outer circumference of the metal shell 4 has no seam, thus the metal shell 4 has better waterproof function.

An inner circumferential wall of the metal shell 4 is attached to an outer circumference edge of the base portion 11 of the insulative housing 1, an upper side and a lower side of the metal shell 4 are respectively welded with the horizontal fixing portions 33 of the two metal fixing parts 3 together by a laser. Because the horizontal fixing portion 33 has the relative larger thickness, so that it may prevent the horizontal fixing portion 33 from being burnt through by the laser and the horizontal fixing portion 33 may be reliably welded with the metal shell 4 together, thereby promoting connection stability between the metal shell 4 and the insulative housing 1.

As shown in FIG. 4, a mating cavity 41 between a front end of the metal shell 4 and the mating tongue 12 is formed and surrounded by the front end of the metal shell 4. A rear end of the metal shell 4 surrounds the glue receiving groove 15 of the insulative housing 1 therein, and the terminal fixing portion 13 of the insulative housing 1 extends rearwardly beyond the metal shell 4.

Figure 5:
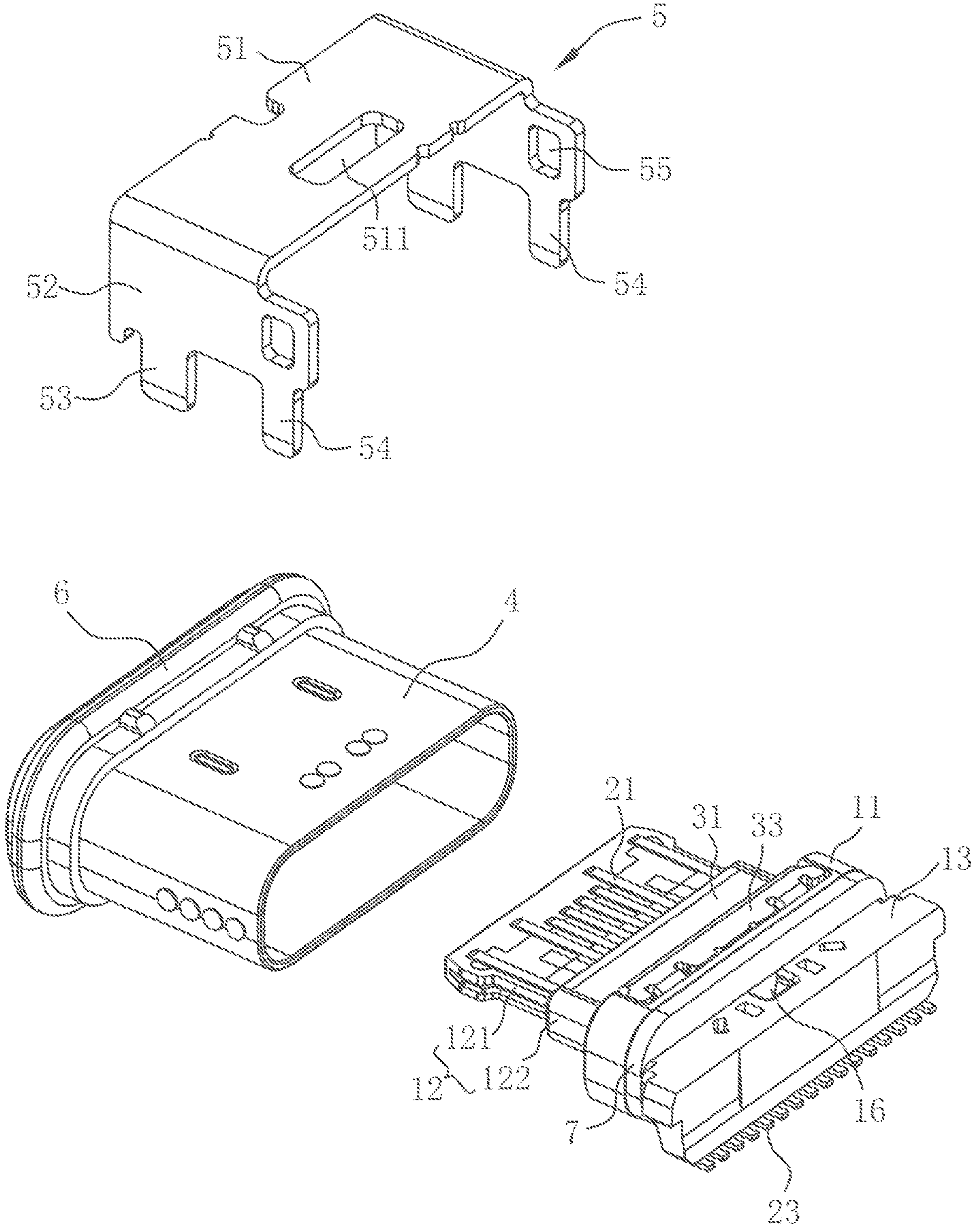
FIG. 5 and FIG. 6 are perspective exploded views of FIG. 1.
Figure 6:
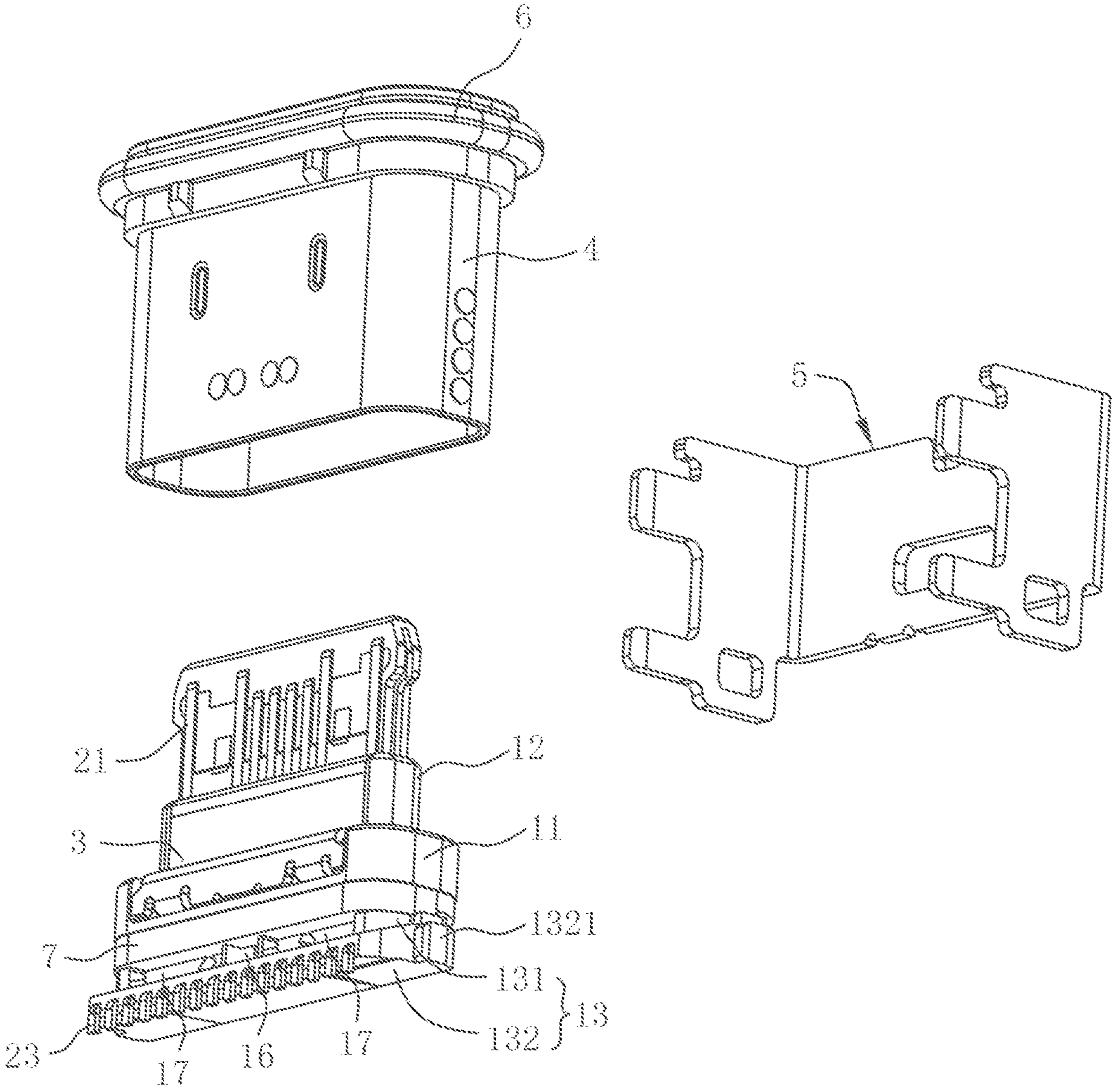

Referring to FIG. 4 to FIG. 6, the glue 7 is filled in the glue receiving groove 15 of the insulative housing 1 and forms a sealing at the rear end of the metal shell 4, so that it may prevent external water from rearwardly permeating into an interior of an electronic device (not shown) of the electrical connector 100 from the mating cavity 41.

When the glue 7 is applied, the glue 7 is preferably injected from an upper portion of the glue receiving groove 15. Because the connecting portion 22 of the conductive terminal 2 is exposed in the glue receiving groove 15, the glue 7 will pass through gaps between the conductive terminals 2 and flow downwardly. Because the number of the conductive terminal 2 is more, the gap positioned between two adjacent conductive terminals 2 is smaller, when a conventional structure is not provided with the recessed portion 16, a siphon phenomenon will be generated when the glue 7 flows and the glue 7 flows downwardly via the gap between the conductive terminals 2, which easily causes most of the glue flows to below the conductive terminals 2 and results in non-uniform distribution of the glue between above and below the conductive terminals 2, results in that less glue is positioned above the conductive terminals 2 to cause sealing to be not tight, and that more glue is positioned below the conductive terminals 2 and when the more glue is subjected to heat and expanded, the more glue generates a squeezing force with respect to the terminal fixing portion 13 to cause the conductive terminal 2 to warp upwardly. However according to the structure of the present embodiment, the provision of the recessed portion 16 may balance the flow of the glue 7, alleviate siphon phenomenon, and make the distributions of the glue 7 above and below the conductive terminals 2 more uniform, so that the sealing above and below the conductive terminals 2 can be assuredly made, and the squeezing force with respect to the terminal fixing portion 13 is more dispersed, occurrence of deformation of the terminal fixing portion 13 is reduced, positions of the soldering portions 23 of the plurality of conductive terminals 2 may be better hold, reliability of subsequent soldering is promoted, product yield is promoted.

As shown in FIG. 4, when the electrical connector 100 is soldered and fixed to a circuit board (not shown) by a SMT (Surface Mounted Technology) process, the glue 7 will be subjected to heat and expanded, under structure limiting by the metal shell 4, the expanded glue 7 will rearwardly push the terminal fixing portion 13, because the terminal fixing portion 13 is arranged to be offset toward below the central axis L of the electrical connector 100 and engagement locations between the terminal fixing portion 13 and the base portion 11 and the conductive terminals 2 are near the central axis, in conventional embodiments, an expansion force of the glue 7 will generate an anticlockwise rotation moment with respect to the terminal fixing portion 13, which causes the lower half part of the terminal fixing portion 13 to flip upwardly, in turn causes the soldering portion 23 to upwardly warp, and results in poor soldering. However, in the structure of the present embodiment, because the bottom portion of the terminal fixing portion 13 is provided with the fencing portion 17, the expansion force of the glue 7 will be applied to the front partitioning wall 171 of the fencing portion 17, because the thickness of the front partitioning wall 171 is very thin and the recessed groove 173 is provided behind the front partitioning wall 171 to allow the front partitioning wall 171 to rearwardly deform, the front partitioning wall 171 will occur to rearwardly deform to absorb an expansion amount of the glue 7, so that expansion of the glue 7 close to the lower half part of the terminal fixing portion 13 will not generate a very large rearward pushing force with respect to the lower half part of the terminal fixing portion 13, but an expansion force of the glue 7 close to an upper half part of the terminal fixing portion 13 will assuredly be applied to the upper half part of the terminal fixing portion 13, in such a way, it may prevent the terminal fixing portion 13 from occurrence of improper flip by the method of reducing the flipping moment, so that it prevents the soldering portions 23 of the conductive terminals 2 extending out of the guiding portion 132 to upwardly warp, ensures soldering reliability between the soldering portion 23 and the circuit board, promotes product yield. The front partitioning wall 171 thus provides a deformable wall of the electrical connector 100.

Referring to FIG. 4 to FIG. 6, the waterproof sealing ring 6 sheathes an outer circumference of the front end of the metal shell 4. The waterproof sealing ring 6 may cooperate with a casing of an electronic device of (not shown) such as a mobile and the like, to prevent external water from permeating into the interior of the electronic device. The waterproof sealing ring 6 preferably is directly formed over the metal shell 4 by injection molding, is tightly engaged with the metal shell 4, is not easily separated from the metal shell 4, and has a better waterproof performance.

Referring to FIG. 4 to FIG. 6, the fixing shell 5 of the present embodiment is integrally formed by stamping a metal plate, and include a top plate 51, two side plates 52 bending downwardly from two sides of the top plate 51 respectively and extending, a front fixing leg 53 extending downwardly from a front end of the side plate 52, and a rear fixing leg 54 extending downwardly from a rear end of the side plate 52. The top plate 51 is provided with a through hole 511. The rear end of the side plate 52 extend outwardly beyond the top plate 51, and a part of the rear end of the side plate 52 extending beyond the top plate 51 is provided with a latching hole 55.

The fixing shell 5 covers the metal shell 4. the top plate 51 is attached to an upper surface of the metal shell 4, a position of the through hole 511 faces the horizontal fixing portion 33 positioned in the metal shell 4, so as to permit four welding points between the metal shell 4 and the metal fixing part 3 in laser welding. The two side plates 52 are respectively engaged with two side walls of the metal shell 4 together by laser welding. The latching hole 55 latches to the protrusion 1321 of the terminal fixing portion 13, thereby firmly fixing the terminal fixing portion 13.

The front fixing leg 53 and the rear fixing leg 54 extend downwardly beyond the metal shell 4 and are used to be mounted to a circuit board (not shown), so that the electrical connector 100 is fixed to the circuit board.

The electrical connector 100 is fixed and mounted to the circuit board by the fixing shell 5, the structure of the fixing shell 5 may be flexibly provided according to the structure type of the circuit board, for example, the front fixing leg 53 and the rear fixing leg 54 are adaptively adjusted, so that the metal shell 4 may designed as a universal structure, which promotes universality and lowers moldmaking cost, so that product cost is lowered.

Figure 12:
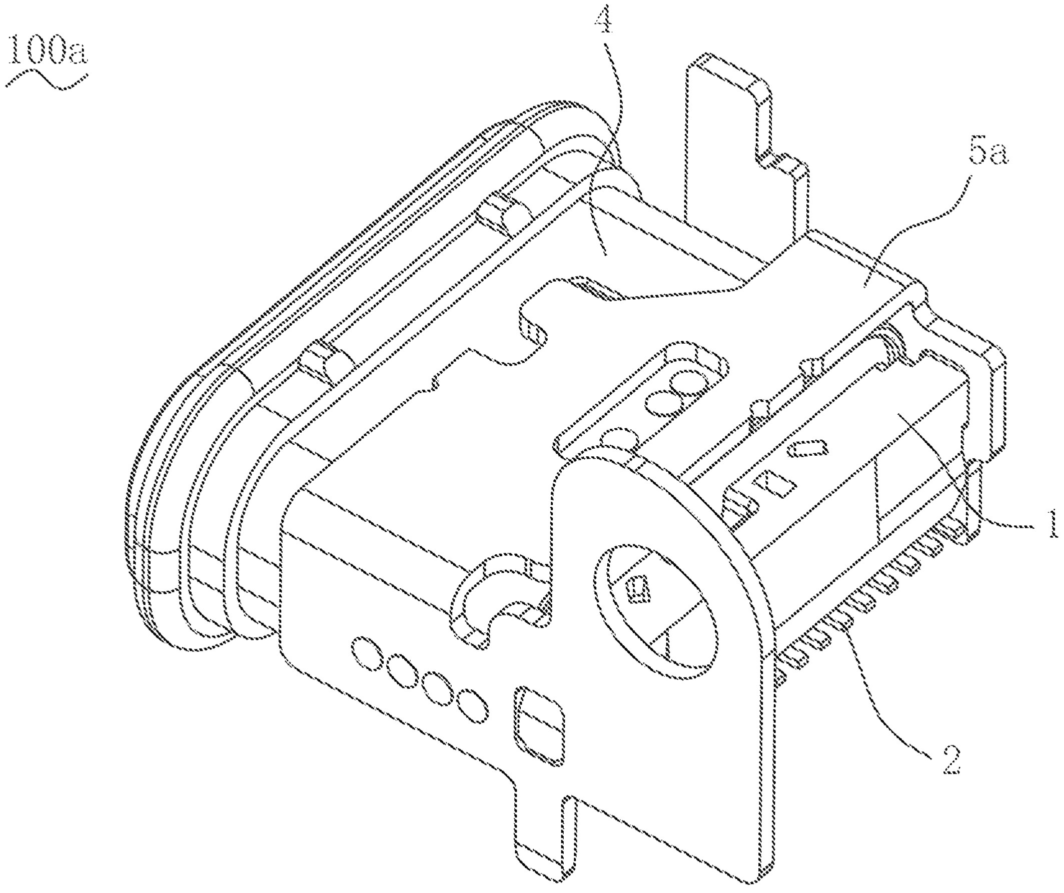
FIG. 12 is a perspective view of another embodiment of the electrical connector of the present disclosure.
Figure 13:
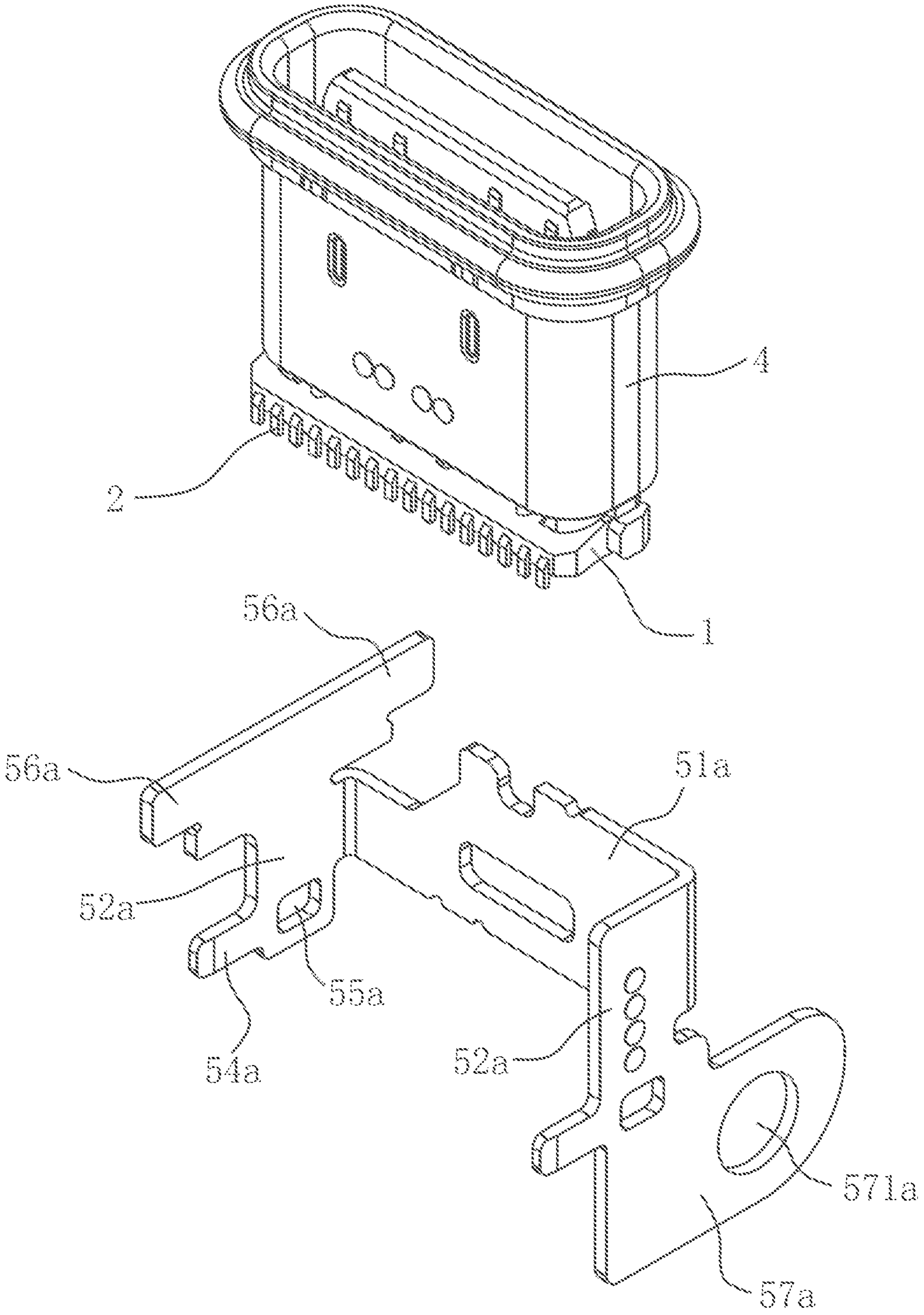
FIG. 13 and FIG. 14 are perspective exploded views of FIG. 12 from two different angles.
Figure 14:
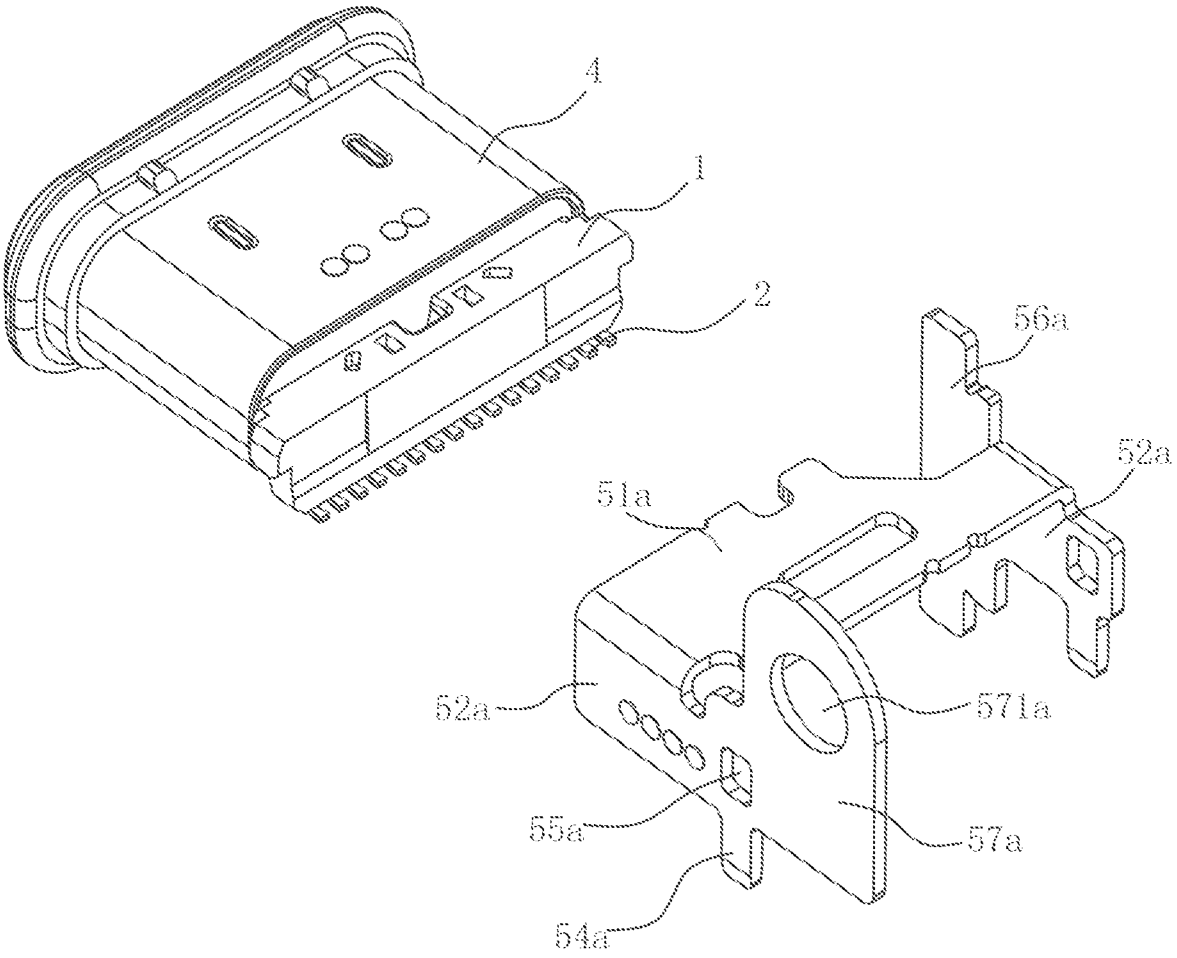

Referring to FIG. 12 to FIG. 14, in an electrical connector **100*a* of another embodiment of the present disclosure, a fixing shell 5*a* in another structural form is employed. In the electrical connector 100*a*, structures with respect to the insulative housing 1, the conductive terminal 2, the metal shell 4** are referred to the above description.

The fixing shell **5*a* similarly includes a top plate 51*a* and two side plates 52*a* downwardly bending from two sides of the top plate 51*a* and extending. A rear fixing leg 54*a* downwardly extend from a rear end of each of the two side plates 52*a*** and is used to be fixed to a circuit board.

Two positioning flanges **56*a* protrude from a front end of one side plate 52*a* of the two side plates 52*a* respectively toward an upper side and a lower side of the front end of the one side plate 52*a*, a rear end of the one side plate 52*a* is provided with a latching hole 55*a* which latches with the insulative housing 1. A combination of the two positioning flanges 56*a* and the one side plate 52*a* has a T-shaped structure, the two positioning flanges 56*a* may be received in corresponding positioning grooves (not shown) of a product casing (not shown) provided by the electrical connector 100*a*, thereby providing positioning when the electrical connector 100*a*** is mounted to the product casing.

A fixing piece **57*a* extends rearwardly from a rear end of the other side plate 52*a* of the two side plates 52*a*, the fixing piece 57*a* is provided with a fixing aperture 571*a*, a fixing screw (not shown) may pass through the fixing aperture 571*a*, so as to lock the electrical connector 100*a* to the product casing, which is convenient to assemble the electrical connector 100*a***.

A manufacturing and assembling process of the electrical connector 100/**100*a* generally includes following steps: making the insulative housing 1, the conductive terminals 2 and the latching metal members 8 to be engaged with each other by insert molding to form the terminal base 9, mounting the two metal fixing parts 3 to the terminal base 9**;

manufacturing the metal shell 4, then forming the waterproof sealing ring 6 at the front end of the metal shell 4 by injection molding; next making the metal shell 4 sheathe the outer circumference of the insulative housing 1, and welding the metal shell 4 and the metal fixing part 3 together by a laser; filling the glue 7 at the rear end of the insulative housing 1 to seal the rear end of the metal shell 4; finally making the fixing shell 5 or the fixing shell 5*a* cover the metal shell 4, and welding the side plate 52/52*a* and the metal shell 4 together by a laser.

In comparison with the prior art, in the electrical connector 100/100*a* of the present disclosure, the terminal fixing portion 13 of the insulative housing 1 is provided with the hollow fencing portion 17 thereon, the fencing portion 17 is provided adjacent to the glue receiving groove 15, when the electrical connector 100/100*a* is soldered to a circuit board, the fencing portion 17 may absorb deformation amount of the glue 7 when the glue is subjected to heat and is expanded, so as to prevent the glue 7 from applying a force to the terminal fixing portion 13 to generate a flip torque with respect to the terminal fixing portion 13 and to cause the soldering portion 23 of the conductive terminal 2 to warp upwardly, poor soldering phenomenon resulted from warping of the soldering portion 23 is reduced, product yield of the electrical connector 100/100*a* is promoted. According to comparison with the prior art, warping ratio of the conductive terminals 2 subject to high temperature reflow soldering may be lowered to 0.07% from 0.15% in the prior art, product yield is significantly promoted.

In another aspect, in the electrical connector 100/100*a* of the present disclosure, the metal fixing part 3 has the horizontal protecting portion 31 and the horizontal fixing portion 33 which have inconsistent thicknesses. The horizontal protecting portion 31 having a smaller thickness covers the thickening portion 122 of the mating tongue 12, may avoid occurrence of improper electrical contact with the conductive terminal 2 in the mating tongue 12, at the same time also increase strength of the mating tongue 12 to prevent the mating tongue 12 from being broken off. The horizontal fixing portion 33 having a larger thickness is inserted into the base portion 11, and is welded with the metal shell 4 together by a laser, the horizontal fixing portion 33 having the larger thickness may prevent the horizontal fixing portion 33 from being burnt through by the laser, so that the horizontal fixing portion 33 may be reliably welded with the metal shell 4 together, thereby promoting connection stability and grounding shield effect of the metal shell 4 and the insulative housing 1.

Furthermore, the metal fixing part 3 which has inconsistent thicknesses and the metal shell 4 which has a consistent thickness in the front-rear direction and formed by a drawing process or a stamping process are used in combination, it may be very convenient to correspondingly adjust the thickness of the horizontal fixing portion 33 according to the metal shell 4 having a different thickness, moreover adjusting the metal fixing part 3 is low in cost and has flexibility in design.

The above described contents are only the preferred embodiments of the present disclosure, which cannot limit the implementing solutions of the present disclosure, those skilled in the art may conveniently make corresponding variation or modification based on the main concept and spirit of the present disclosure, therefore the extent of protection of the present disclosure shall be determined by terms of the Claims.

What is claimed is:

1. An electrical connector comprising:

an insulative housing which comprises a base portion, a mating tongue protruding forwardly from the base portion and a terminal fixing portion positioned behind the base portion;

a glue receiving groove between the base portion and the terminal fixing portion and configured to allow a glue to fill therein;

a fencing portion formed in the insulative housing and provided at a side of the glue receiving groove, the fencing portion being formed by a front partitioning wall and a side partitioning wall which forms a hollow recessed groove therein which is in direct fluid communication with the glue receiving groove such that the hollow recessed groove is configured to receive a flow of glue from the glue receiving groove;

a plurality of conductive terminals, each conductive terminal including a mating portion exposed on the mating tongue, a soldering portion extending out of the terminal fixing portion and a connecting portion connected between the mating portion and the soldering portion, and wherein a part of the connecting portion is exposed to the glue receiving groove; and a first shell sheathing an outer circumference of the insulative housing and forms a mating cavity which surrounds the mating tongue therein.

2. The electrical connector according to claim 1, wherein the fencing portion is provided at a bottom surface of the insulative housing, and an opening of the hollow recessed groove faces downwardly.

3. The electrical connector according to claim 2, wherein a middle of the glue receiving groove has a recessed portion protruding therefrom, the recessed portion having opposite sides and penetrating the insulative housing from an upper side of the insulative housing to a lower side of the insulative housing; and wherein the fencing portion is provided at each side of the recessed portion.

4. The electrical connector according to claim 3, wherein each fencing portion is provided in the terminal fixing portion and comprises a front partitioning wall and a side partitioning wall, wherein the front partitioning wall faces the base portion, the side partitioning wall is positioned to one side of the recessed portion, and the front partitioning wall and the side partitioning wall encircle the hollow recessed groove from outside.

5. The electrical connector according to claim 1, wherein the fencing portion is configured to deform to absorb deformation of the glue.

6. The electrical connector according to claim 1, wherein the shell is metal.

7. The electrical connector according to claim 1, wherein the fencing portion is formed in the terminal fixing portion.

8. The electrical connector according to claim 3, wherein the recessed portion penetrates the terminal fixing portion from an upper side of the terminal fixing portion to a lower side of the terminal fixing portion.

9. An electrical connector comprising:

an insulative housing which comprises a base portion, a mating tongue protruding forwardly from the base portion and a terminal fixing portion positioned behind the base portion;

a glue receiving groove between the base portion and the terminal fixing portion and configured to allow a glue to fill therein;

- a fencing portion formed in the insulative housing and provided at a side of the glue receiving groove, the fencing portion comprising a deformable wall which forms a hollow recessed groove in the insulative housing;
- a plurality of conductive terminals, each conductive terminal including a mating portion exposed on the mating tongue, a soldering portion extending out of the terminal fixing portion and a connecting portion connected between the mating portion and the soldering portion, wherein a part of the connecting portion is exposed to the glue receiving groove; and
- a first shell sheathing an outer circumference of the insulative housing and forms a mating cavity which surrounds the mating tongue therein.

10. The electrical connector according to claim 9,
further comprising two metal fixing parts respectively fixed to an upper side and a lower side of the insulative housing, each metal fixing part including a horizontal protecting portion having a first thickness and a horizontal fixing portion having a second thickness, the first thickness is less than the second thickness, the horizontal protecting portion covers a surface of a rear portion of the mating tongue, and the horizontal fixing portion is inserted into a surface of the base portion, and welded with the first shell together.

11. The electrical connector according to claim 9,
further comprising a second fixing shell fixed to the first shell, the second fixing shell including a top plate and two side plates respectively bending from two sides of the top plate, two positioning flanges protrude from one side plate of the two side plates respectively toward an upper side and a lower side of the one side plate; and
a fixing piece extends out from the other side plate of the two side plates, the fixing piece is provided with a fixing aperture.

12. The electrical connector according to claim 9, wherein the base portion of the insulative housing and the terminal fixing portion are connected together by two connecting ribs respectively positioned at two sides of the glue receiving groove.

13. The electrical connector according to claim 9, wherein the fencing portion is provided at a bottom surface of the insulative housing, and an opening of the hollow recessed groove faces downwardly.

14. The electrical connector according to claim 13, wherein a middle of the glue receiving groove has a recessed portion protruding therefrom, the recessed portion having opposite sides and penetrating the insulative housing from an upper side of the insulative housing to a lower side of the insulative housing; and
the fencing portion is provided at each side of the recessed portion.

15. The electrical connector according to claim 14, wherein the recessed portion penetrates the terminal fixing portion from an upper side of the terminal fixing portion to a lower side of the terminal fixing portion.

16. The electrical connector according to claim 9, wherein the first shell is metal.

17. The electrical connector according to claim 9, wherein the fencing portion is formed in the terminal fixing portion.

18. An electrical connector comprising:

- an insulative housing including a base portion, a mating tongue protruding forwardly from the base portion and a terminal fixing portion positioned rearward of the base portion;
- a glue receiving groove between the base portion and the terminal fixing portion and which is configured to allow a glue to fill therein, a middle of the glue receiving groove having a recessed portion having opposite sides, the recessed portion penetrating the insulative housing from an upper side of the insulative housing to a lower side of the insulative housing;
- a fencing portion provided at each side of the recessed portion, each fencing portion being positioned at the lower side of the insulative housing, each fencing portion defining a hollow recessed groove which has an opening facing downwardly;
- a plurality of conductive terminals, each conductive terminal including a mating portion exposed on the mating tongue, a soldering portion extending out of the terminal fixing portion and a connecting portion connected between the mating portion and the soldering portion, and a part of the connecting portion is exposed to the glue receiving groove; and
- a shell sheathing an outer circumference of the insulative housing and forms a mating cavity which surrounds the mating tongue therein.

19. The electrical connector according to claim 18, wherein the recessed portion penetrates the terminal fixing portion from an upper side of the terminal fixing portion to a lower side of the terminal fixing portion.

20. The electrical connector according to claim 18, wherein the fencing portion is configured to deform to absorb deformation of the glue.

* * * * *